(12) United States Patent
Maasland et al.

(10) Patent No.: US 12,465,332 B2
(45) Date of Patent: Nov. 11, 2025

(54) METHOD AND SYSTEM FOR ANALYZING INTESTINAL MICROFLORA OF A SUBJECT

(71) Applicant: HORAIZON technology B.V., Delfgauw (NL)

(72) Inventors: Troy Maasland, Delfgauw (NL); Evgeni Levin, Delfgauw (NL)

(73) Assignee: HORAIZON technology B.V., Delfgauw (NL)

( * ) Notice: Subject to any disclaimer, the term of this patent is extended or adjusted under 35 U.S.C. 154(b) by 525 days.

(21) Appl. No.: 17/957,841

(22) Filed: Sep. 30, 2022

(65) Prior Publication Data
US 2023/0104704 A1    Apr. 6, 2023

Related U.S. Application Data

(60) Provisional application No. 63/251,119, filed on Oct. 1, 2021.

(30) Foreign Application Priority Data

Oct. 1, 2021 (EP) ..................... 21200561

(51) Int. Cl.
*A61B 10/00* (2006.01)
*G06T 7/00* (2017.01)
(Continued)

(52) U.S. Cl.
CPC ........ *A61B 10/0038* (2013.01); *G06T 7/0012* (2013.01); *G06V 10/143* (2022.01); *G06V 10/40* (2022.01); *G06V 10/764* (2022.01); *G06V 10/774* (2022.01); *G16B 20/00* (2019.02); *G06T 2207/10152* (2013.01);
(Continued)

(58) Field of Classification Search
None
See application file for complete search history.

(56) References Cited

U.S. PATENT DOCUMENTS

| | | |
|---|---|---|
| 2021/0151137 A1 | 5/2021 | Zedayko et al. |
| 2022/0039357 A1* | 2/2022 | Roth ............... G06N 20/00 |
| 2024/0037734 A1* | 2/2024 | Fitzke ............. G06V 10/764 |

FOREIGN PATENT DOCUMENTS

WO    WO 2021/022162 A1    2/2021

OTHER PUBLICATIONS

European Patent Office, extended European Search Report in corresponding European Application No. 21200561.5, dated Jun. 21, 2022 (11 pages).

(Continued)

*Primary Examiner* — Thomas D Lee
(74) *Attorney, Agent, or Firm* — Leydig, Voit & Mayer, Ltd.

(57) ABSTRACT

A method and system for analyzing and/or estimating intestinal microflora of a subject. A digital image of a sample of feces of the subject is received by one or more processors. The digital image and/or one or more features extracted from the digital image is provided as input to a trained machine learning model which is configured to output a classification based on said input digital image and/or one or more features extracted from the digital image. Data indicative of one or more properties of the intestinal microflora of the subject based on the output image classification is determined by the one or more processors.

23 Claims, 7 Drawing Sheets (51) Int. Cl.
  *G06V 10/143* (2022.01)
  *G06V 10/40* (2022.01)
  *G06V 10/764* (2022.01)
  *G06V 10/774* (2022.01)
  *G16B 20/00* (2019.01)

(52) U.S. Cl.
  CPC .......... *G06T 2207/20081* (2013.01); *G06T 2207/30092* (2013.01); *G06V 2201/03* (2022.01)

(56) References Cited

OTHER PUBLICATIONS

Lin Liu et al., "Automatic identification of fungi under complex microscopic fecal images," Journal of Biomedical Optics, 20(7), pp. 076004-1 to 076004- (Jul. 2015).

Md Ferdous Wahid et al., "Classification of Microscopic Images of Bacteria Using Deep Convolutional Neural Network," 10th International Conference on Electrical and Computer Engineering, Dhaka Bangladesh, pp. 217-220 (Dec. 20-22, 2018).

* cited by examiner

METHOD AND SYSTEM FOR ANALYZING INTESTINAL MICROFLORA OF A SUBJECT

CROSS-REFERENCE TO RELATED APPLICATIONS

This nonprovisional patent application claims priority to and the benefit of U.S. Provisional Patent Application No. 63/251,119, filed Oct. 1, 2021, and European Patent Application No. 21200561.5, filed Oct. 1, 2021, which are both hereby incorporated by reference in their entirety.

FIELD OF THE DISCLOSURE

The disclosure relates to a method analyzing intestinal microflora of a subject (e.g. estimating intestinal microflora composition). The disclosure also relates to a system configured for analyzing intestinal microflora of a subject. Furthermore, the disclosure relates to a method of determining an indication of a subject's health. Additionally, the disclosure relates to a method of training a machine learning model for analyzing intestinal microflora of a subject. Also, the disclosure relates to a computer program product.

BACKGROUND TO THE DISCLOSURE

It is well known that the gut microbiome can provide valuable insights into the health and lifestyle habits of a subject. Specific lifestyle habits such as a diet may have an impact on the intestinal microflora of the subject.

Determining a relationship between the subject and its bacterial colonizers (cf. host-microbiome relationship) may provide valuable insights, which can benefit for example digestion, the immune system and various other aspects of health. Such relationship which exists in a symbiotic state may be exposed to environmental and host-specific factors which may cause variations. For example, some events or dietary habits of the host may alter the relationship. In extreme cases, for example as a result of extreme stress, alcohol misuse, medication, inappropriate diet, disease, allergies, sleep deprivation, etc., the imbalance in the microflora may cause dysbiosis or breakdown of the relationship and interactions. This may result in important changes in the functional composition and metabolic activities.

An imbalance of unhealthy and healthy microbes in the intestines may contribute to health issues, such as weight gain, high blood sugar, high cholesterol, etc. Nevertheless, the gut microbiome is very adaptable and typically responds to positive lifestyle choices. The diet of the subject may be an important modifiable factor influencing the composition of the gut microbiota. Hence, therapeutic dietary strategies may be employed in order to manipulate microbial diversity, composition, and stability. Other ways to influence microbial composition as well as health status of the individuals includes Fecal Microbial Transplants (FMT) which have been used prove causal role of microbiome for variety of health conditions. For instance, a fiber-rich diet, intake of probiotics or particular supplements may speed up the gut biome restoration. The gut microbiota of the subject may play a key role in personalized nutrition.

Unfortunately, it may be cumbersome to adequately analyze the intestinal microflora. Although rapid progress in DNA sequencing technology has provided ever-increasing outputs coupled with lowered costs, facilitating an explosion in amplicon sequencing studies, it remains a barrier in many cases. In this way, the current technologies are not suited for efficient monitoring of the microbiota of subjects.

There is a strong need for a faster and more efficient process for effectively analyzing and estimating intestinal microflora of a subject.

SUMMARY

It is an object of the disclosure to provide for a method and a system that obviates at least one of the above-mentioned drawbacks.

Additionally or alternatively, it is an object of the disclosure to improve the analysis and/or characterization of intestinal microflora of a subject.

Additionally or alternatively, it is an object of the disclosure to improve the efficiency of microbiome analysis.

Additionally or alternatively, it is an object of the disclosure to provide for a cost-effective method and system for analyzing (e.g. estimating) the intestinal microbiome of a subject.

Thereto, the disclosure provides for a method for analyzing (e.g. estimating) intestinal microflora of a subject, comprising: receiving, by one or more processors, a digital image of a sample of feces of the subject. The subject can be human or animal. The method includes providing the digital image and/or one or more features extracted from the digital image as input to a trained machine learning model which is configured to output a classification based on said input digital image and/or one or more features extracted from the digital image; and determining, by the one or more processors, data indicative of one or more properties of the intestinal microflora of the subject based on the output image classification.

Images of fecal samples are used for rapid and efficient analysis of the microbiome. The analysis can for example be used for rapid microbiome profiling and/or enterotype estimation, only using an image of the fecal sample or features extracted from said image. Advantageously, laboratory analysis is not needed. The process becomes less cumbersome and allows more easy, efficient and cost-effective monitoring of the microbiome of the subject. Additionally, this allows to perform multiple tests during a period of time, which would be unpractical if laboratory tests were to be conducted. For example, an image of a fecal sample may be monitored every day in order to track changes in the microbiome of the subject. As a result, it becomes significantly more easy to provide for personalized diet. It can be determined whether the diet of the subject has to be adjusted in order to improve the microbial balance (cf. prevent microbial imbalance). Thus, advantageously, impaired microbiota can be better prevented in this way.

Preferably, the digital image is a macroscopic image. The macroscopic image can e.g. have a field of view of at least 30 mm wide and at least 30 mm tall. The digital image can e.g. have a field of view of at least 75 mm wide and at least 75 mm tall, such as at least 150 mm wide and at least 150 mm tall. The digital image can advantageously be obtained using a camera of a mobile device, such as a mobile phone. Optionally, the digital image is an image of a fecal streak on a substrate.

Utilizing a fecal streak on a substrate can significantly improve the performance of the trained machine learning model. Furthermore, the machine learning model can be trained using less data. The training process can thus become more efficient if training data with fecal streaks are used for training the machine learning model (e.g. deep learning network model). This is an important benefit, as obtaining the training data may require expensive (laboratory) tests, for instance involving DNA/RNA sequencing.

Furthermore, as the accuracy of the trained machine learning model can be enhanced by using an image of a fecal streak on a substrate, it is possible to better prevent impaired microbiota of the subject. The trained machine learning model can provide improved predictability, whilst an efficient and simple method can be used. It is rather easy to make an image of a fecal streak on a substrate. In some cases, this image may be provided by a non-professional, for instance the subject may take the image of the fecal streak on a substrate.

Optionally, the fecal streak is obtained by smearing a layer of feces on the substrate.

By smearing a sample of feces on the substrate, a relatively thin layer of feces can be obtained. Such a thin layer of feces, which allow trained machine learning model to extract various features of the image such as but not limited to composition, color, texture, granularity and many others, may increase the performance of the trained machine learning model, and also improve training of the machine learning model.

Optionally, the thickness of the fecal streak layer is smaller than 3000 micrometer, more preferably smaller than 1000 micrometer, even more preferably smaller than 500 micrometer.

Optionally, the layer of feces is smeared on the substrate by means of a blade (or a brush). Using a blade, a relatively thin layer of feces can be applied on the substrate rather easily. In this way, a more uniform distribution of the feces over the substrate can be obtained. In this way, the grittiness of the feces may be more easily captured in the image. For instance, the granularity or structure of the feces sample can be better captured, resulting in improved performance and training of the machine learning model.

Optionally, the substrate is a sheet of paper, such as white paper, e.g. having a TAPPI brightness of 92 or higher. The sheet of paper can have a weight of about 50-200 $g/m^2$, such as about 80 $g/m^2$. The sheet of paper can have a surface roughness of about 80-300 mL/min measured using the Bendtsen method (ISO 8791-2) (e.g. using a Lorentzen & Wettre Roughness tester, applying constant compressed air (98 kPa), as specified in the SCAN-P 21 TAPPI UM 535 standard test method).

A sheet of paper is readily available and can provide easily sufficient contrast in the image of the sample of feces of the subject, under normal lighting condition. Additionally, by using a sheet of paper, a cost-effective solution can be obtained.

Optionally, the substrate and/or an area covered by the fecal streak have dimensions falling within a predetermined range.

In some examples, a sheet of paper with a predetermined size is used, for instance a sheet of paper in A4 format (or any other format). It is also possible that some region of a substrate is used for smearing the sample of feces. In some examples, a substrate is provided with a pre-marked region in which the feces sample has to be smeared. For example, a rectangle, circle, square, etc. region may be marked on a sheet of A4 paper. Optionally, the substrate may be printable by means of a printer based on an electronic format file, such as a Portable Document Format (PDF) file. This allows users for easily obtaining the substrate. Such electronic file may be easily provided to the user via a mobile app, such as an Android or iOS app or the like.

Optionally, the image classification is associated to abundances of predetermined microbial species, genera and other phylogenetic information.

Visual properties of the fecal samples, which can be identified by image detection models such as a trained machine learning model, can be linked to a subject's microbiome. It will be appreciated that in the macroscopic digital image an optical resolution per pixel can be larger than a dimension of individual microbiota. Hence, in the macroscopic digital image individual microbiota cannot be discerned. Nevertheless, it has been found that data indicative of one or more properties of the intestinal microflora of the subject can be determined from the visual properties of the fecal samples in the macroscopic digital image.

The composition of the gut microbiota in subjects may be associated to the health condition of the subject. The dietary composition can be a significant target in a strategy aiming at monitoring the health of the subject, or even prevention of metabolic diseases. The health monitoring can be made more easy by utilizing images of fecal streaks on a substrate. In this way, the scale of health monitoring can be improved, since a large number of subjects may provide their own images, for instance via a mobile application. The analysis can be performed on-the-fly using a mobile app. The images of the users may be uploaded to a server which is configured to analyze the images using the trained machine learning model. The classification output of the trained machine learning model may optionally be further post-processed and provided back to the user and/or to one or more health professionals.

Advantageously, personalized nutrition may become available to a wider range of people. Recent studies have observed a high variability in the effects on glucose tolerance to food between subjects although the meals or more specific food items were identical. For example, based on the analysis of the image of the fecal sample, a glucose response can be predicted by collecting data regarding personal features and/or gut microbiota composition. Hence, a personalized diet may be easily built taking into account the analysis of the intestinal microflora of the subject. In a similar fashion a personalized diet may be built for an animal.

Optionally, the predetermined microbial genera include one or more microbial enterotypes or microbial abundance profiles, such as but not limited to *Prevotella* and/or *Bacteroides*. Estimation of microbial biomarkers (e.g. *Prevotella*, *Bacteroides*, and its ratio) has been found to be indicative for optimum human nutrition.

A diverse array of microbes may colonize the human intestine. The analysis of the intestinal microbiota may be used for characterizing a healthy or normal intestinal microbiome. It can also provide insights in what factors modify the intestinal microbiome in the healthy state and how the intestinal microbiome affects normal host physiology. Such factors may be different for different subjects, thus allowing a personalized assessment. A number of factors, including age, host immune system, host genetics, diet and medication use (e.g. antibiotic use) appear to modify the intestinal microbiome in the normal state to some extent. The microbiome may play a critical role in the healthy human immune system and metabolism.

Optionally, the method includes determining, based on the output image classification, relative abundances of the one or more predetermined microbial enterotypes, species or genera, such as but not limited to a ratio of the abundance of *Prevotella* genera and the abundance of *Bacteroides* genera.

Optionally, the predetermined microbial genera include one or more pathogenic microbial enterotypes or microbial abundance profiles, such as but not limited to *Salmonella* and/or *E. coli*. This proves useful in assessing quality of human and animal nutrition. It can also be used for early detection of outbreaks, e.g. on farms.

Optionally, the method includes determining, based on the output image classification, microbial diversity. Microbial diversity refers to the number of different species in the gut microbiome and how evenly they are represented. A high microbial diversity, i.e. a high number of different species that are evenly spread across the gut microbiome, is representative of a healthy, resilient gut.

Optionally, the method includes determining a personalized nutrition based on the determined data indicative of the one or more properties of the intestinal microflora of the subject. The personalized nutrition can e.g. be based on microbial abundance profiles, such as but not limited to *Prevotella* and/or *Bacteroides*. The personalized nutrition can e.g. be based on ratios of microbial abundance profiles, such as but not limited to a *Prevotella* to *Bacteroides* ratio. The personalized nutrition can e.g. be based on pathogenic microbial enterotypes or microbial abundance profiles, such as but not limited to *Salmonella* and/or *E. coli*. The personalized nutrition can e.g. be based on microbial diversity. The personalized nutrition can be aimed at increasing microbial diversity.

It has been found that the *Prevotella* enterotype, dominated by the *Prevotella* genus, but possibly also enriched with various species that are in a complex trophic network with some of the *Prevotella* species, is associated with a non-industrialized dietary fiber-rich diet and is more commonly found in vegetarians. On the opposite side of the microbial composition gradient one can find two *Bacteroides* enterotypes, especially commonly found in North America and/or urbanized environments. The *Bacteroides*1 enterotype represents a still fermentatively functional microbiome composition, with adequate microbial density and gene diversity levels, characterized by high levels of *Bacteroides/Phocaeicola* and *Blautia*. The *Bacteroides*2 enterotype constitutes a composition which should be considered dysbiotic. The *Bacteroides*2 enterotype is characterized by low microbial (gene) diversity, low microbial density, increased Enterobacteriaceae levels (amongst others), decreased levels of various (presumed) beneficial commensals, higher water content levels and more likely still being in the saccharolytic phase of fermentation and has been linked with systemic inflammation and a plethora of other undesirable associations such as with inflammatory bowel disease, obesity, and type 2 diabetes. High consumption levels of red meat, sugars and fried foods at the expense of the intake of whole grains, fruits, fish, seeds, and nuts is typical in Western diets. As a result, western diets contain high amounts of trans fats, saturated fats, animal protein and a low amount of dietary fiber. Sugars, trans fats, saturated fats, and animal proteins are characterized as negative contributors to vascular health since they are associated with the upregulation of blood cholesterol (total and LDL). The increase of these same dietary components is similarly associated with shifts in the gut microbiome towards compositions that are *Bacteroides* dominated (*Bacteroides* enterotype), especially the *Bacteroides*2 enterotype that has a low microbial alpha diversity, typically also has increased Enterobacteriaceae levels and is commonly linked with diabetes, obesity and various other risk factors directly associated with cardiovascular disease. On the other hand, in high fiber content diet studies, a positive association between high fiber consumption and the abundance of species and/or genera related to the *Prevotella* enterotype is observed.

Hence, based on the determined data indicative of the one or more properties of the intestinal microflora of the subject, such as microbial abundance profiles, a status of the current nutritional pattern and/or health of the subject can be determined. Based on the current nutritional pattern and/or health of the subject a personalized nutrition for the subject can be determined in order to improve or maintain health. An objective of the personalized nutrition may e.g. be aimed at changing a ratio of the abundance of *Prevotella* genera and the abundance of *Bacteroides* genera towards a higher ratio of the abundances of *Prevotella* genera relative to the abundance of *Bacteroides* genera.

Optionally, the method for analyzing the intestinal microflora of the subject is repeated over time. Such repeated analysis provides information on the effectivity of any changes in the determined data indicative of the one or more properties of the intestinal microflora of the subject, such as microbial abundance profiles, as a result of any changes to the subject's nutrition.

A bi-directional relationship between the intestinal microbiota and the subject can be vital to health. The disclosure enables easy and efficient monitoring data indicative of the composition of the intestinal microbiota An enhanced understanding of such relationship can be used for improving the health of the subject. Additionally or alternatively, it can be employed for better understanding disease, which can result in improved therapeutic approaches.

Optionally, the digital image of the sample of feces is obtained under white light illumination. This provides a convenient way of obtaining the digital image by the user, and has proven to provide good indication of the intestinal microflora. The white light illumination provides substantially even illumination across the visible spectrum.

Optionally, the digital image of the sample of feces is obtained under narrow band illumination. The narrow band illumination can be used to more effectively discriminate certain properties of the microflora. The narrow band illumination can e.g. comprise white light with certain wavelength ranges attenuated, or only dedicated wavelength ranges.

Optionally, the digital image includes autofluorescence of the sample of feces. The autofluorescence can e.g. be obtained by illuminating the sample of feces with light exciting the autofluorescence, such as light in the blue and/or ultraviolet range. It has been found that the digital image including autofluorescence can provide enhanced data indicative of one or more properties of the intestinal microflora.

Optionally, the machine learning model has been trained using a data set comprising a plurality of digital images of fecal samples, each digital image accompanied by microbial measurement data representative of abundances of the predetermined microbial enterotype, species or genera in the fecal sample in the digital image.

Optionally the data set includes digital images obtained under white light illumination, narrow band illumination or autofluorescence excitation illumination. In one embodiment, the machine learning model has been trained using a data set comprising a plurality of digital images obtained under white light illumination accompanied by the microbial measurement data, for processing user digital images obtained under white light illumination. In another embodiment, the machine learning model has been trained using a data set comprising a plurality of digital images obtained under narrow band illumination accompanied by the microbial measurement data, for processing user digital images obtained under narrow band illumination. In another embodiment, the machine learning model has been trained using a data set comprising a plurality of digital images obtained under autofluorescence excitation illumination accompanied by the microbial measurement data, for processing user digital images obtained under autofluorescence excitation illumination.

Optionally, the measurement data includes sequencing data, such as but not limited to 16S ribosomal RNA or shotgun sequencing data, corresponding to the fecal sample in the digital image.

Optionally, the measurement data accompanying each digital image is statistically normalized to a predetermined total abundance of the predetermined microbial genera.

Optionally, the data set used for training is augmented using one or more image transformations, such as cropping, rotation, translation, and color change.

According to an aspect, the disclosure provides for a method of determining an indication of a subject's health based on data indicative of one or more properties of the intestinal microflora of the subject determined according to any of the preceding claims.

Advantageously, the method can be used for performing dietary interventions. For instance, saturated fats and animal protein, which are typically high in a Western diet, are associated with metabolic disorders such as obesity, reduced insulin sensitivity, type 2 diabetes, and cardiovascular disease, and also altered microbiota, e.g., reduced diversity. For example, dietary fiber can have preventive potential on cardiometabolic risk, and may be employed in a personalized diet.

Optionally, the digital image of the sample of feces of the subject is taken by means of a mobile device and uploaded to a server, wherein the server is configured to carry out the method according to the disclosure.

In this way, a user friendly method can be obtained, reducing the barrier for (frequent) monitoring of the intestinal microflora. The users themselves may provide the images, for instance by uploading the images via a mobile app. In some cases, this would not require any additional tools. For example, the substrate may be a sheet of paper, which is available to users. Furthermore, the camera of the mobile device may be used for capturing the digital image of the fecal sample. The tools used for getting the fecal sample (e.g. scoop) or smearing the fecal sample on the substrate for obtaining a fecal streak (e.g. blade) may also be easily available to the users. In some examples, these tools may be provided to the users by means of a kit of parts.

Optionally, the method is used for monitoring temporal microbiome variations. The machine learning model, for instance a deep neural network model, may be used to track changes in fecal microbiota in relation to fecal images over time.

According to an aspect, the disclosure provides for a method for training a machine learning model for analyzing intestinal microflora of a subject with digital images of fecal samples, the method including: a) receiving a data set comprising a plurality of digital images of fecal samples; b) receiving measurement data representative of abundances of the predetermined microbial enterotype, species or genera in the fecal sample in each digital image of the plurality of digital images; and c) training the machine learning data processing model based on the date received in step b) and the digital images received in step a) for enabling, after completion of the training period, the step of automatically associating abundances of predetermined microbial enterotype, species, or genera with digital images of fecal samples. It will be clear that the digital images used for training the machine learning model are preferably macroscopic images. The digital images used for training can e.g. have a field of view of at least 30 mm wide and at least 30 mm tall. The digital images used for training can e.g. have a field of view of at least 75 mm wide and at least 75 mm tall, such as at least 150 mm wide and at least 150 mm tall. The digital images used for training can advantageously be obtained using a camera of a mobile device, such as a mobile phone.

Determining the composition of human gut microbiota (e.g. designated enterotypes) may be a cumbersome task, requiring a lot of resources. For instance, DNA/RNA sequencing may be performed. By employing an image of the fecal sample, for instance a fecal streak, the training efficiency of the machine learning model may be improved. As a result, the involved costs for training the machine learning model may be lower. The disclosure provides for a cost-effective solution for monitoring and/or analyzing the intestinal microflora of a subject.

Optionally, the measurement data includes any sequencing data, for example being such as a 16S sequencing data, corresponding to the fecal sample in the digital image.

Optionally, the measurement data accompanying each digital image is normalized to a predetermined total abundance of the predetermined microbial genera.

According to an aspect, the disclosure provides for a system for analyzing intestinal microflora of a subject, the system comprising: one or more processors for receiving a digital image of a sample of feces of the subject; and a memory storing a trained machine learning model, wherein the trained machine learning model is configured to output a classification based on the digital image and/or one or more features extracted from the digital image provided as input; and wherein the one or more processors are configured to determine, data indicative of one or more properties of the intestinal microflora of the subject based on the output image classification.

Preferably, the digital image is a macroscopic image. The macroscopic image can e.g. have a field of view of at least 30 mm wide and at least 30 mm tall. The digital image can e.g. have a field of view of at least 75 mm wide and at least 75 mm tall, such as at least 150 mm wide and at least 150 mm tall. The digital image can advantageously be obtained using a camera of a mobile device, such as a mobile phone.

Advantageously, the system can provide for a rapid and simple mechanism for identifying microbial phenotypes which are important in long-term metabolic health based on gut microbiota.

According to an aspect, the disclosure provides for a computer program product configured for performing, when run on a computer, the steps of the method according to the disclosure.

According to an aspect, the disclosure provides for a trained machine learning model, the trained machine learning model being configured for use in a method for analyzing intestinal microflora of a subject, wherein the trained machine learning model is configured to receive an image of a fecal sample of a subject as input and provide a classification as output, the classification being indicative of one or more properties of the intestinal microflora of the subject.

Optionally, the computer program is a mobile app which is executable on a mobile device, such as a mobile phone or a tablet. In some examples, the computer program is executable on a personal computer, such as a Windows, Macintosh (Apple), Linux, and/or Unix machine.

According to an aspect, the disclosure provides for a processor implemented method for determining an intestinal microbial composition of a subject, comprising: receiving, by one or more processors, a digital image of a sample of feces of the subject; and determining, by the one or more processors, the intestinal microbial composition of the subject on the basis of inferred patterns between the image and its corresponding microbial profile obtained for example by sequencings procedure. Various high sequencing procedures may be used, for instance high throughput sequencing procedures. Optionally, the pattern determination is performed using a machine learning data processing model that has been trained to associate abundances of the predetermined microbial species, genera and other phylogenetic information with digital images of fecal samples.

According to an aspect, the disclosure provides for a system for determining an intestinal microbial composition of a subject, comprising: one or more processors for receiving a digital image of a sample of feces of the subject; a memory storing a machine learning data processing model that has been trained to associate abundances of predetermined microbial genera with digital images of fecal samples; wherein the one or more processors are configured to determine, on the basis of the digital image and using the machine learning data processing model, the intestinal microbial composition of the subject.

A deep learning neural network can be seen as a representation-learning method with a plurality of levels of representation, which can be obtained by composing simple but non-linear modules that each transform the representation at one level, starting with the raw input, into a representation at a higher, slightly more abstract level. The deep neural network may identify patterns which are difficult to see using conventional or classical methods. Hence, instead of writing custom code specific to a problem of identifying visual patterns in the images of the fecal sample of the subject, the network can be trained to be able to handle different and/or changing images of the feces sample e.g. using a classification algorithm. Training data may be fed to the deep neural network such that it can determine a classification logic for efficiently analyzing intestinal microflora of the subject.

It will be appreciated that any of the aspects, features and options described in view of the methods apply equally to the systems and the described devices, computer program products. It will also be clear that any one or more of the above aspects, features and options can be combined.

BRIEF DESCRIPTION OF THE DRAWING

The disclosure will further be elucidated on the basis of exemplary embodiments which are represented in a drawing. The exemplary embodiments are given by way of non-limitative illustration. It is noted that the figures are only schematic representations of embodiments of the disclosure that are given by way of non-limiting example.

In the drawing.

DETAILED DESCRIPTION

Figure 1:
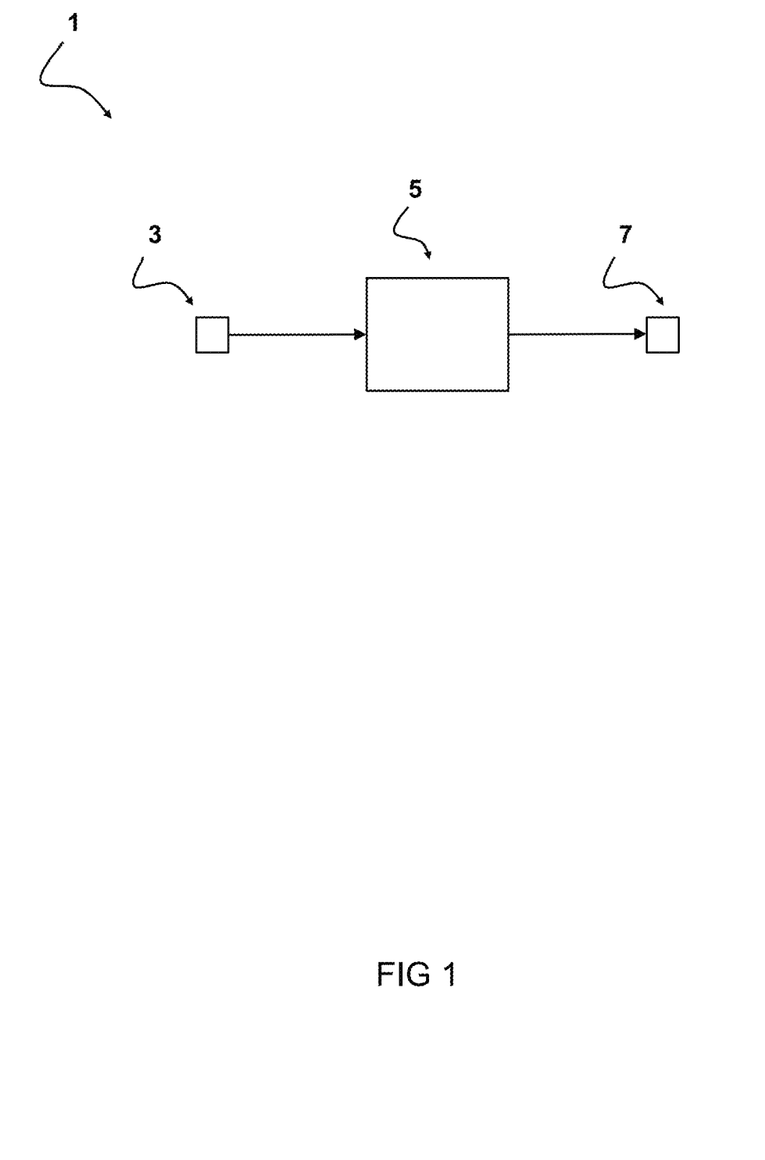
FIG. 1 shows a schematic diagram of a system.

FIG. 1 shows a schematic diagram of a system 1 for analyzing intestinal microflora of a subject. The system 1 comprises one or more processors for receiving a digital image 3 and/or one or more features extracted from the digital image 3, which is provided as input to trained machine learning model 5, wherein the trained machine learning model 5 is configured to output a classification 7 based on the digital image 3 and/or one or more features extracted from the digital image 3. The one or more processors are configured to determine, data indicative of one or more properties (e.g. abundance levels) of the intestinal microflora of the subject based on the output image classification 7.

Figure 2:
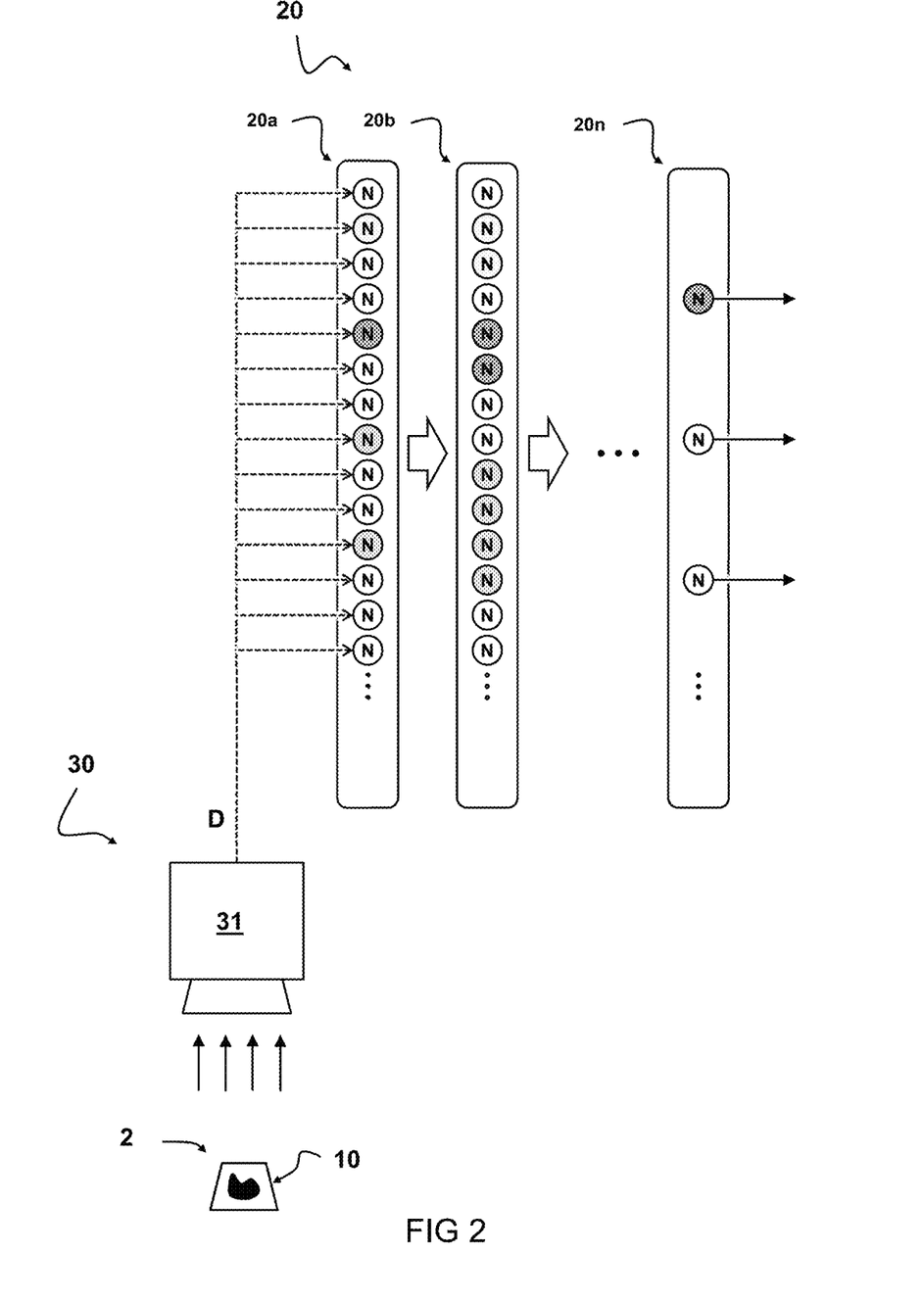
FIG. 2 shows a schematic diagram of a system.

FIG. 2 shows a schematic diagram of an embodiment of a deep neural network 20 comprising a plurality of neurons "N". The neurons "N" are distributed over multiple layers 20a-n to form a deep neural network. Typically, such layers include an input layer 20a, an output layer 20n, and one or more one or more hidden layers 20b-(n−1) therebetween. The trained neural network can be configured to calculate output values Ox, Oy, Oz of neurons in the output layer 20n which may be based on a series of received input values based on the image of the sample of feces 2 of the subject. In this example, the sample of feces 2 is placed on a surface 10. The image may for instance be taken by means of a sensor unit 30. The sensor unit 30 can be a digital visual camera or the like. The camera may be a stand-alone camera, however, it is also possible to use camera of a mobile device, such as for instance a mobile phone, a tablet, or the like. In some examples, the image is taken in normal lighting conditions by placing the camera 31 substantially transverse with respect to the surface (e.g. substrate) on which the sample of feces 2 is placed. Hence then white light illumination is used. However, advantageously, in some embodiments, a transformation is performed on the captured image for projecting the image such as to compensate for visual effects due to the angle between the camera and the surface on which the sample of faces 2 is placed. This step can significantly improve the results when mobile devices are used for taking the images. Often, in such cases the relative position between the camera and the surface/substrate on which the feces is placed is sub-optimal.

In the shown example, the neural network 20 comprises an input layer 20a with neurons configured to receive input values corresponding to one or more images of the sample of the feces of the subject on a surface (e.g. substrate). For instance, the feces can be put on a substrate, such as for instance a piece of paper. In some examples, the sample of feces is smeared out on the substrate/surface such as to become a streak of feces. It will be appreciated that other sensory data or data derived therefrom can be used as input. In some embodiments, features extracted from the images (e.g. by performing image processing steps) are provided as input to the deep neural network.

In some embodiments, e.g. as shown, interconnections between the neurons "N" are formed exclusively across subsequent layers, e.g. between the input layer 20a and the first hidden layer 20b, between the first hidden layer 20b and the second hidden layer 20c (not shown), etc., up to the last hidden layer (index n−1, not shown) and the output layer 20n. Also other configurations of networks and connections may be envisaged.

A controller of the system may be configured to communicate with the sensor unit 30 comprising at least one sensor device, e.g. camera 31, for registering sensor data representing a sample of the feces of the subject. In some examples, the camera 31 is placed above the sample of feces and a top image is taken. The controller can be also configured to comprise or communicate with the neural network 20. For example, neural network 20 is configured (and/or programmed) to receive the sensor data D, and process the sensor data D to calculate the one or more output values Ox, Oy, Oz, etc. (e.g. classification values representing a respective classification of the sample of feces).

Many other types sensor devices may be envisaged. Also combinations of two or more sensors can be used as input to a neural network (e.g. deep neural network). The two or more sensors may be of the same type or different types. For example, the system may comprise a number of different cameras, e.g. combination of visual camera and infrared camera.

Based on the sensor data registered by the sensor unit 30, the neural network may classify the data. In some embodiments, the classifications may be predetermined, and the neural network may be trained to recognized the classifications (supervised learning). In other embodiments, the neural network may itself determine a set of classifications that may then be labelled (unsupervised learning). In some examples, the output of the neural network may calculate a probability of classifications indicative of or related to one or more properties of the intestinal microflora of the subject.

The classification values Ox, Oy, Oz may serve as input to a further system or module which is to advise certain actions, such as for example health monitoring, personalized diet proposals, etc. It may also be served as input to further system components (not shown) which may take action (e.g. alert a health professional) or present options based on the classification. The classification values Ox, Oy, Oz may also be simply output to a user interface reporting the event (not shown).

Aspects of the present disclosure may also relate to corresponding methods of training a neural network. In one embodiment, the method comprises classifying one or more properties of the intestinal microflora of the subject based on an image of the sample of feces of the subject. In some examples, a (non-transitory) computer-readable medium can be provided with software instructions that, when executed, causes performing the method as described herein, or forming a network or computer system as described herein. It will be appreciated that analyzing steps may also be performed on cloud systems or platforms (e.g. server).

Figure 3:
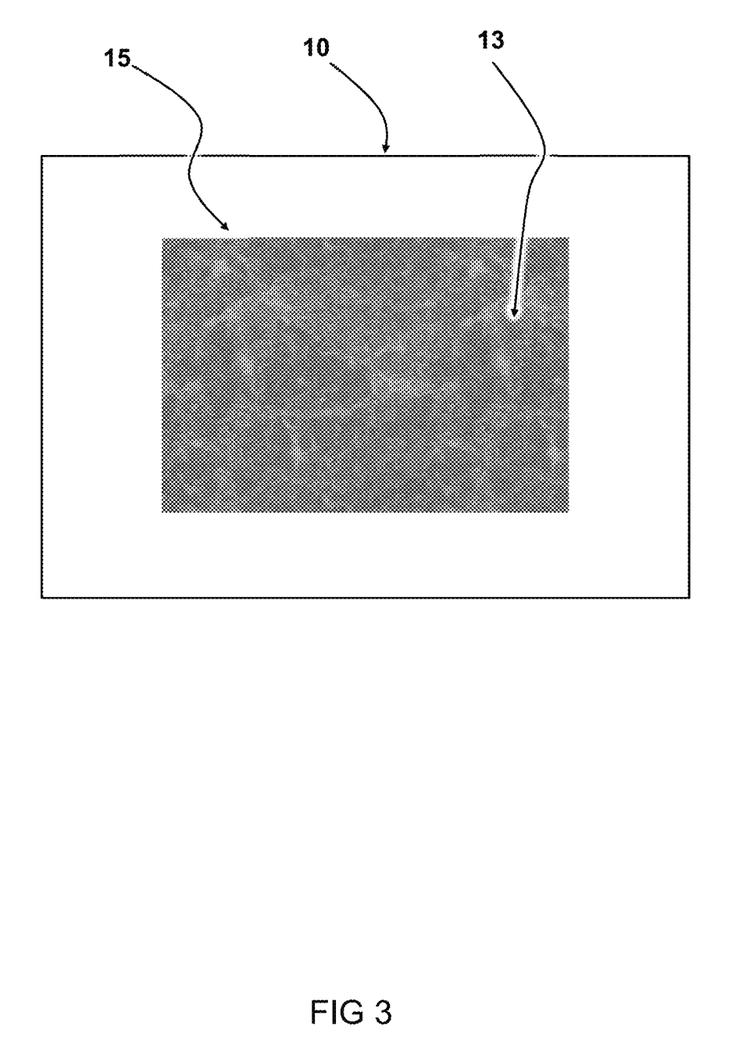
FIG. 3 shows a schematic diagram of a substrate with a fecal streak applied thereon.

FIG. 3 shows a schematic diagram of a substrate 10 with a fecal streak 13 applied thereon. The fecal streak 13 has been applied on a portion or region 15 of the substrate 10. The substrate 10 with fecal streak 13 can be effectively used for analyzing and estimating intestinal microflora of a subject. A digital image of the substrate 10 with fecal streak 13 can be taken. The digital image and/or one or more features extracted from the digital image may be provided as input to a trained machine learning model which is configured to output a classification based on said input digital image and/or one or more features extracted from the digital image. Data indicative of one or more properties of the intestinal microflora of the subject can be determined based on the output image classification.

Figure 4:
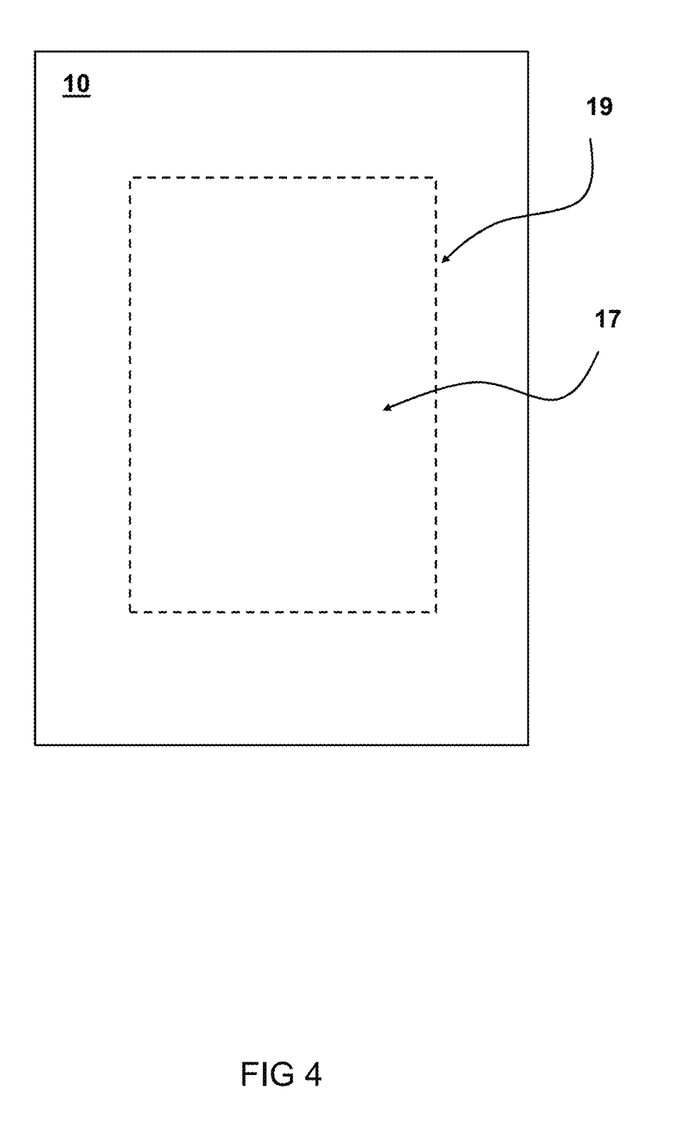
FIG. 4 shows a schematic diagram of a substrate.

FIG. 4 shows a schematic diagram of a substrate 10. The substrate 10 has a region 17 which is visually indicated by marking lines 19 (dashed line) in which the fecal streak is to be provided. The substrate 10 may be a sheet of paper (e.g. standard A4 format), allowing the user to easily produce it (e.g. by printing a digital document such as a PDF document, Word Document, or the like). This is particularly advantageous when fecal samples are frequently monitored. The user can perform the analysis by means of a mobile device with an app. The app can be configured to receive the image of the sample of feces and upload it to a server or the cloud for analysis by means of the trained machine learning model. As in this example the sheet of paper is of A4 format, the field of view of the digital image is approximately 30×21 cm. Hence, in this example, the digital image is a macroscopic image. Other dimensions of the field of view are possible. The macroscopic digital image can e.g. have a field of view of at least 30 mm wide and at least 30 mm tall. The macroscopic digital image can e.g. have a field of view of at least 75 mm wide and at least 75 mm tall, such as at least 150 mm wide and at least 150 mm tall. The macroscopic digital image can advantageously be obtained using a camera of a mobile device, such as a mobile phone. The mobile phone camera can e.g. have 48 megapixels, i.e. about 8000×6000 pixels.

One or more results from the analysis can be fed back to the user. This also enables to track the evolution of the state of intestinal microflora of the subject over time (e.g. periodically sampling, such as for instance with time intervals of days, weeks or months).

Figure 5A:
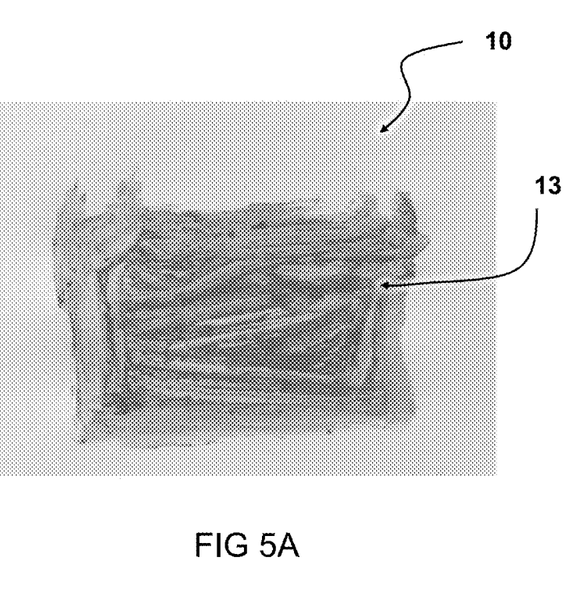
FIG. 5a, 5b show an image of a fecal streak on a substrate.
Figure 5B:
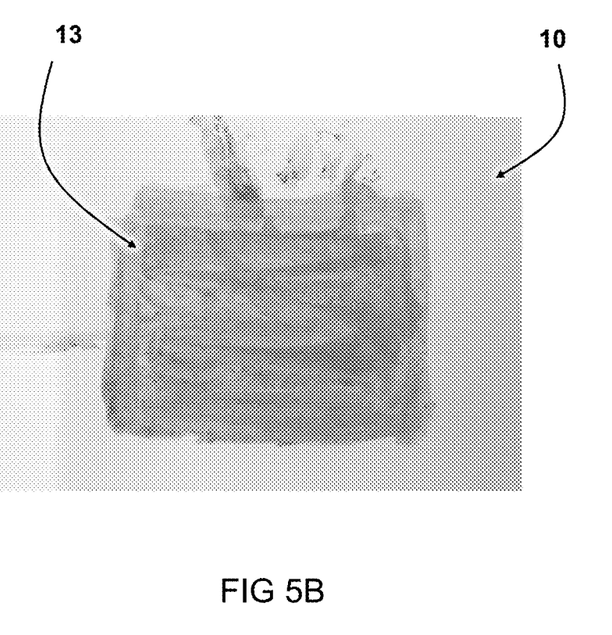

FIG. 5a, 5b show an image of a fecal streak on a substrate 10. Two examples of fecal streak pictures are shown. In this example, the images are obtained under white light illumination. FIG. 5a shows an image of a fecal streak 13 on a substrate 10 which is *Prevotella* rich, and FIG. 5b shows an image of a fecal streak 13 on a substrate 10 which is *Bacteroides* rich. Temporal microbiome variations may be associated with health status. In some examples, deep neural network models are used to explore changes in fecal microbiota in relation to fecal images over time. The picture of fecal streak shown in FIG. 5a can be analyzed for composition and structure and linked to gutmicrobiota composition. Experiments were carried out with fecal samples comparing fecal streak with 16S sequencing. The trained machine learning model provided a good predictive value (AUC above 0.82) of fecal imaging with gutmicrobiota composition. In these exemplary experiments the deep learning image models are able identify patterns and association with abundances of gutmicrobial groups such as *Prevotella/Bacteroides* which are not detectable by the naked eye. The digital images in this example are macroscopic images of A4 size substrates. Individual *Prevotella* or *Bacteroides* also cannot be discerned in the digital images in these examples. Beyond just colour differences, the subtle features such as compositional changes, smaller particles of faces spread on the substrate 10, consistency, etc., all contribute to good classification score of the computational machine learning model. In this example, the substrate 10 was a A4 paper. Advantageously, the analysis is stable with respect to various noisy image background options and light conditions.

In the example of FIG. 5a, 5b, the image classification is associated particularly to microbial abundance profiles relating to *Prevotella* and/or *Bacteroides*. It is also possible that the image classification is associated to pathogenic microbial enterotypes or microbial abundance profiles, such as but not limited to *Salmonella* and/or *E. coli*. This proves useful in assessing quality of human and animal nutrition. It can also be used for early detection of outbreaks, e.g. on farms. It is also possible that the image classification is associated to microbial diversity. Microbial diversity refers to the number of different species in the gut microbiome and how evenly they are represented. A high microbial diversity, i.e. a high number of different species that are evenly spread across the gut microbiome, is representative of a healthy, resilient gut.

Figure 7A:
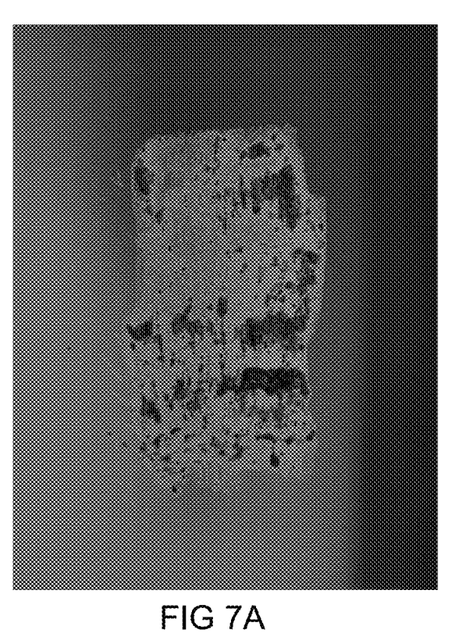
FIG. 7a shows an image of a sample of feces on a substrate obtained under narrow band illumination.
Figure 7B:
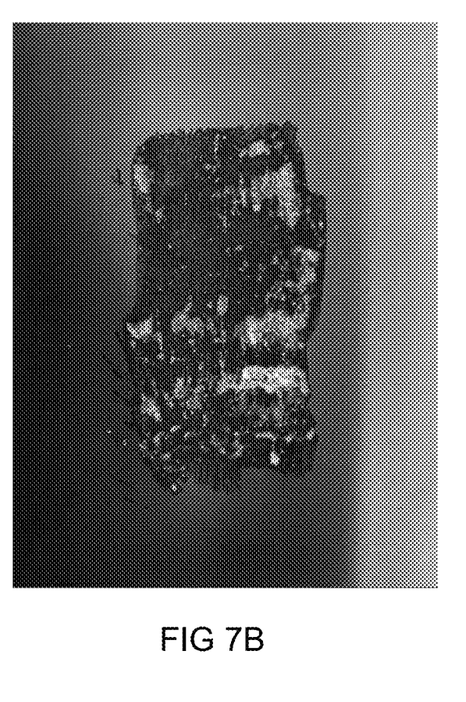
FIG. 7b shows an image of autofluorescence of a sample of feces on a substrate.

In the example of FIG. 5a, 5b, the digital images are obtained under white light illumination. However, different illumination may be used. In the example of FIG. 7a, the digital image of the sample of feces is obtained under narrow band illumination. The narrow band illumination can be used to more effectively discriminate certain properties of the microflora. In the example of FIG. 7b the digital image includes autofluorescence of the sample of feces. The autofluorescence is in this example obtained by illuminating the sample of feces with light exciting the autofluorescence, here in the ultraviolet range. It has been found that the digital image including autofluorescence can provide enhanced data indicative of one or more properties of the intestinal microflora.

The machine learning model can be trained on 16s sequencing data and digital images of the fecal streaks (example above) samples, such as to identify microbial phenotypes such as fecal structure as well as presence and relative abundance of microbial species, or ratios between certain species in the sample. Advantageously, the machine learning model is used for visual evaluations of stool samples.

In an example, a dataset of fecal images is collected and subsequently used for training an image detection machine learning model. The dataset may contain images of fecal samples spread out on substrate, e.g. on a standard white A4 paper. The illumination of the images in the dataset may e.g. be white light illumination, narrow band illumination, and/or autofluorescence excitation illumination. Particularly, a separate dataset of white light illumination, narrow band illumination, or autofluorescence excitation illumination images may be provided for training the image detection machine learning model for use with white light illumination, narrow band illumination, or autofluorescence excitation illumination images, respectively. The images may be accompanied by 16S sequencing data. The machine learning model can identify visual properties of the fecal samples which are linked to a subject's microbiome enterotype and/or subject's health. Such information can be subsequently used to establish nutritional guidelines based on images of the feces only. Hence, personalized nutrition can be determined based on the determined data indicative of the one or more properties of the intestinal microflora of the subject. Advantageously, a highly efficient and effective system can be obtained in this way.

In some examples, the training is performed with focus on the genus-level *Prevotella/Bacteroides* ratio. Alternatively, or additionally, training may be performed with focus on pathogenic microbial enterotypes or microbial abundance profiles. Alternatively, or additionally, training may be performed with focus on microbial diversity.

In some examples, during training the images are augmented, i.e., transformed using random transformations, e.g. cropping, rotations, translations, color changes, or the like. The advantage of this is the models are able to learn more general properties of the images, instead of small subtle differences in form of noise. It improves the model's ability to generalize, or in other words be able to perform well on unseen data.

In some examples, the 16S sequencing data was preprocessed. The 16S sequencing data may be normalized to a point where each sample has equal read count. In some examples, all ASV's with less than 0.1*N non-zero read counts were dropped, where N is the sample size. In some examples, all ASV's with an average read count of less than 3 were dropped. However, other values may also be used for these exemplary optional steps.

In some examples, as biological target, or phenotype, the *Prevotella/Bacteroides* ratio on genus level was selected. Advantageously, a high *Prevotella/Bacteroides* ratio is correlated with greater metabolic health. Low ratios may indicate a need in a higher intake of fiber rich food and plant-based protein, which is beneficial for the health of the subject.

Figure 6:
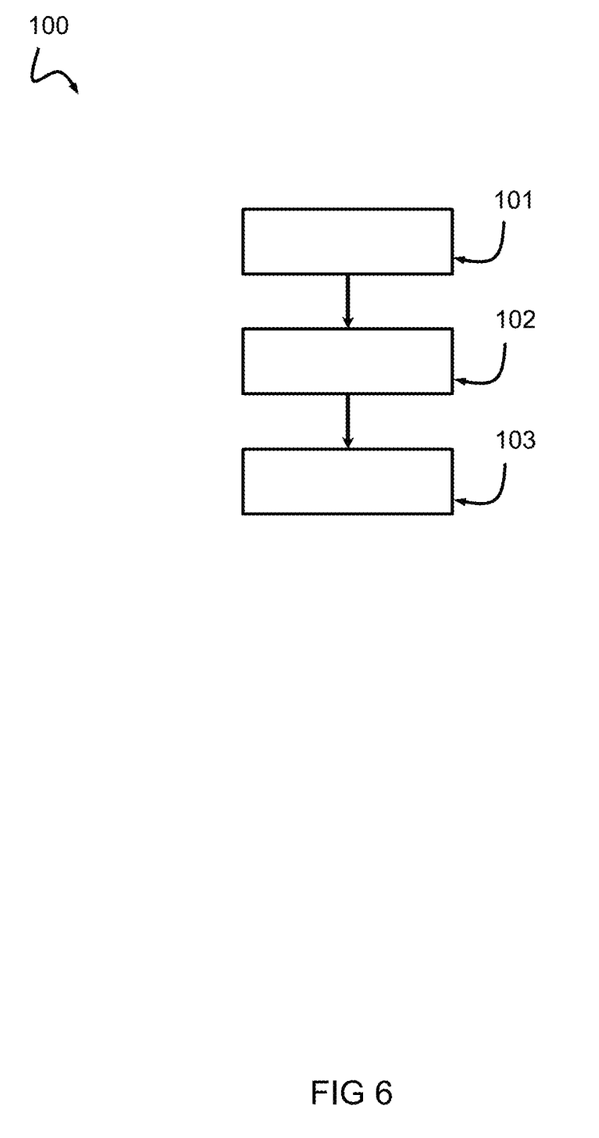
FIG. 6 shows a schematic diagram of a method.

FIG. 6 shows a schematic diagram of a method 100 for analyzing intestinal microflora of a subject. In a first step 101, a digital image of a sample of feces of the subject is received by one or more processors. In a second step, the digital image and/or one or more features extracted from the digital image is provided as input to a trained machine learning model which is configured to output a classification based on said input digital image and/or one or more features extracted from the digital image. In a third step 103, data indicative of one or more properties of the intestinal microflora of the subject is determined based on the output image classification.

In some examples, a mobile device app is used, wherein the mobile device app is configured to allow uploading of a digital image of the sample of feces, preferably spread out on white paper. The images can be analyzed in real-time by the system according to the disclosure (e.g. cloud). In some examples, the users may automatically receive nutritional guidelines and a reasonable estimate of the overall health status of their gut microbiome based on the visual analysis performed by means of the trained machine learning model. However, it is also envisaged that the method is carried out by means of a website or software executed on a computer. Various implementations are possible.

It will be appreciated that various machine learning models may be used. In some examples, a deep learning model is employed. Deep learning allows computational models that are composed of multiple processing layers to learn representations of data with multiple levels of abstraction. In this way, visual pattern recognition may be significantly improved. Deep learning discovers intricate structure in large data sets by using the backpropagation algorithm to indicate how a machine should change its internal parameters that are used to compute the representation in each layer from the representation in the previous layer. Various deep learning networks and architectures may be employed.

It will be appreciated that the subject can be a human or animal (e.g. cattle). For both humans and animals an improved personalized diet can be more easily obtained, taking into account the condition of the intestinal microbiota of the subject. The individual health condition of the subjects can thus be significantly improved in an easy way by employing the method according to the disclosure.

It will be appreciated that the term microbiome may be understood as microorganisms found in the intestines of the subject. The term microbiome encompasses both the microbiota (community of microorganisms) and the theatre of activity (structural elements, and the surrounding environmental conditions).

It will be appreciated that in some examples in the description microbial genera is described. This may represent high level microbial information. However, additionally or alternatively, the method can also be employed with microbial species abundances.

In some examples, the digital image is directly provided as input to the trained machine learning model. Optionally, the digital image is first preprocessed prior to providing it as input to the trained machine learning model, for example involving segmentation (selection of certain portions of data in the digital image overlapping with one or more identified features in the image; filtering; etc). In some example, the pixels of the digital image are provided to the nodes of the input layer of the trained deep learning model.

It will be appreciated that the method may include computer implemented steps. All above mentioned steps can be computer implemented steps. Embodiments may comprise computer apparatus, wherein processes performed in computer apparatus. The disclosure also extends to computer programs, particularly computer programs on or in a carrier, adapted for putting the disclosure into practice. The program may be in the form of source or object code or in any other form suitable for use in the implementation of the processes according to the disclosure. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

It will be further understood that when a particular step of a method is referred to as subsequent to another step, it can directly follow said other step or one or more intermediate steps may be carried out before carrying out the particular step, unless specified otherwise. Likewise it will be understood that when a connection between components such as neurons of the neural network is described, this connection may be established directly or through intermediate components such as other neurons or logical operations, unless specified otherwise or excluded by the context.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

The graphics and/or image/video processing techniques may be implemented in various hardware architectures. Graphics functionality may be integrated within a chipset. Alternatively, a discrete graphics processor may be used. For example, processing of images (still or video) may be performed by a graphics subsystem such as a graphics processing unit (GPU) or a visual processing unit (VPU). As still another embodiment, the graphics or image/video processing functions may be implemented by a general purpose processor, including e.g. a multi-core processor. In a further embodiment, the functions may be implemented in a consumer electronics device. Embodiments, using a combination of different hardware architectures are possible.

In various embodiments, the controller can communicate using wireless systems, wired systems, or a combination of both. When implemented as a wired system, the system may include components and interfaces suitable for communicating or wired communications media, such as input/output (I/O) adapters, physical connectors to connect the I/O adapter with a corresponding wired communications medium. When implemented as a wireless system, the system may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. A wireless communication device may be included in order to transmit and receive signals using various suitable wireless communications techniques. Such techniques may involve communications across one or more wireless networks. Exemplary wireless networks include, but are not limited to, cellular networks, wireless local area networks (WLANs, cfr. WiFi), wireless personal area networks (WPANs), wireless metropolitan area network (WMANs), satellite networks, et cetera. In communicating across such networks, the transmitter may operate in accordance with one or more applicable standards in any version.

Herein, the disclosure is described with reference to specific examples of embodiments of the disclosure. It will, however, be evident that various modifications, variations, alternatives and changes may be made therein, without departing from the essence of the disclosure. For the purpose of clarity and a concise description features are described herein as part of the same or separate embodiments, however, alternative embodiments having combinations of all or some of the features described in these separate embodiments are also envisaged and understood to fall within the framework of the disclosure as outlined by the claims. The specifications, figures and examples are, accordingly, to be regarded in an illustrative sense rather than in a restrictive sense. The disclosure is intended to embrace all alternatives, modifications and variations which fall within the scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

What is claimed is:

1. A method for analyzing intestinal microflora of a subject, comprising:
receiving, by one or more processors, a digital image of a sample of feces of the subject;
providing the digital image and/or one or more features extracted from the digital image as input to a trained machine learning model which is configured to output a classification based on said input digital image and/or one or more features extracted from the digital image; and
determining, by the one or more processors, data indicative of one or more properties of the intestinal microflora of the subject based on the output image classification, wherein the machine learning model has been trained using a data set comprising a plurality of digital images of fecal samples, and wherein each digital image of a fecal sample, of the plurality of digital images of fecal samples, is accompanied by microbial data representative of abundances of predetermined microbial enterotype, species or genera in the fecal sample in the digital image.

2. The method of claim 1, wherein the digital image is an image of a fecal streak on a substrate.

3. The method of claim 2, wherein the fecal streak is obtained by smearing a layer of feces on the substrate.

4. The method of claim 3, wherein the substrate is a sheet of paper.

5. The method of claim 2, wherein the substrate and/or an area covered by the fecal streak have dimensions falling within a predetermined range.

6. The method of claim 1, wherein the digital image is a macroscopic digital image.

7. The method of claim 6, wherein the macroscopic digital image has a field of view of at least 30×30 mm.

8. The method of claim 1, wherein the image classification is associated to abundances of predetermined microbial species, genera and other phylogenetic information.

9. The method of claim 8, wherein the predetermined microbial genera include one or more microbial enterotypes or microbial abundance profiles.

10. The method of claim 9, including determining, based on the output image classification, relative abundances of the one or more predetermined microbial enterotypes, species or genera.

11. The method of claim 8, wherein the predetermined microbial genera include one or more pathogenic microbial enterotypes or microbial abundance profiles.

12. The method of claim 8, including determining, based on the output image classification, microbial diversity.

13. The method of claim 1, including determining a personalized nutrition based on the determined data indicative of the one or more properties of the intestinal microflora of the subject.

14. The method of claim 1, wherein the digital image of the sample of feces is obtained under white light illumination.

15. The method of claim 1, wherein the digital image of the sample of feces is obtained under narrow band illumination.

16. The method of claim 1, wherein the digital image of the sample of feces is obtained under autofluorescence excitation illumination.

17. The method of claim 1, wherein the data includes sequencing data corresponding to the fecal sample in the digital image.

18. The method of claim 1, wherein the data accompanying each digital image is statistically normalized to a predetermined total abundance of the predetermined microbial genera.

19. A method of determining an indication of a subject's health based on data indicative of one or more properties of the intestinal microflora of the subject determined according to claim 1.

20. The method according to claim 19, wherein the digital image of the sample of feces of the subject is taken by means of a mobile device and uploaded to a server, wherein the server is configured to carry out the determining data indicative of one or more properties of the intestinal microflora of the subject based on the output image classification.

21. A method for training a machine learning model for analyzing intestinal microflora of a subject with digital images of fecal samples, the method including:
 a) receiving a data set comprising a plurality of digital images of fecal samples;
 b) receiving data representative of abundances of predetermined microbial enterotype, species or genera in the fecal sample in each digital image of the plurality of digital images; and
 c) training the machine learning data processing model based on the data received in step b) and the digital images received in step a) for enabling, after completing the training, automatically associating abundances of the predetermined microbial enterotype, species, or genera with digital images of fecal samples.

22. A system for analyzing intestinal microflora of a subject, the system comprising:
 one or more processors for receiving a digital image of a sample of feces of the subject; and
 a memory storing a trained machine learning model, wherein the trained machine learning model is configured to output a classification based on the digital image and/or one or more features extracted from the digital image provided as input,
 wherein the machine learning model has been trained using a data set comprising a plurality of digital images of fecal samples,
 wherein each digital image of a fecal sample, of the plurality of digital images of fecal samples, is accompanied by microbial data representative of abundances of predetermined microbial enterotype, species or genera in the fecal sample in the digital image; and
 wherein the one or more processors are configured to determine data indicative of one or more properties of the intestinal microflora of the subject based on the output image classification.

23. The system of claim 22, wherein the data accompanying each digital image is statistically normalized to a predetermined total abundance of the predetermined microbial genera.

* * * * *